3,297,805
PROCESS FOR THE MANUFACTURE OF SOLID
POROUS ARTICLES FROM POLYOLEFINS
Walter Rottig, Oberhausen-Sterkrade-Nord, and Otto Liethen, Duisburg-Hamborn, Germany, assignors to Ruhrchemie Aktiengesellschaft, Oberhausen-Holten, Germany
Filed Feb. 25, 1963, Ser. No. 260,892
Claims priority, application Germany, Mar. 23, 1960, R 27,625; June 11, 1960, R 28,137
4 Claims. (Cl. 264—126)

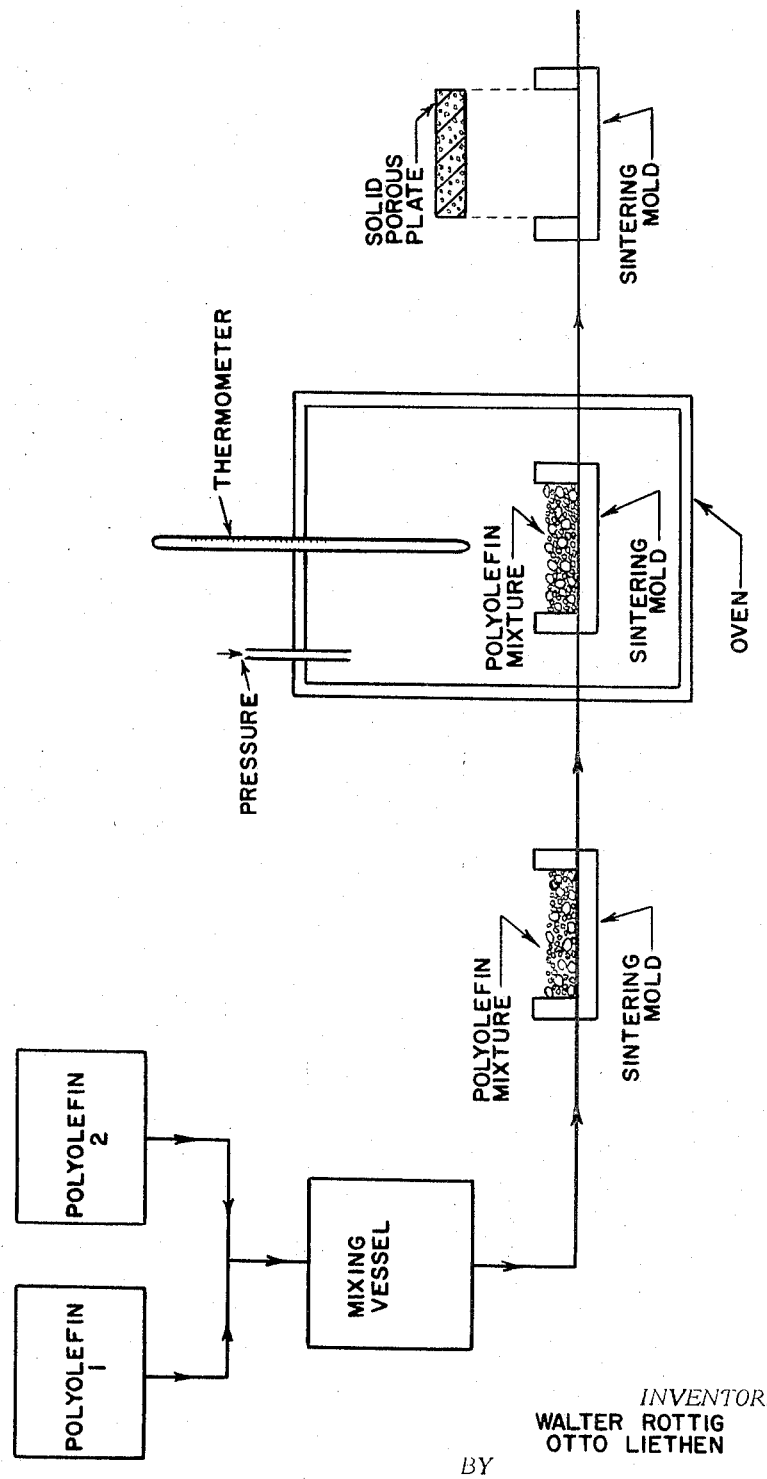

The invention relates to the manufacture of solid porous articles made of polyolefins and, more particularly, to such articles made of mixtures of polyolefins having different characteristics. It is a continuation-in-part of our copending application Serial Number 97,139, filed March 21, 1961, and now abandoned.

The fabrication of polyolefins or of mixtures thereof, on the commonly used machinery, such as extruders, roller mills, etc., leads to dense products which are free of pores. Articles produced in this manner do not lend themselves for use in such technical application where a permeability for gases or for liquids is required. This invention shows a novel manner of manufacturing such porous products.

It has been found that solid porous articles can be made from the group of polyolefins which encompass, e.g., polyethylene and polypropylene and copolymers thereof, or polybutylene, by mixing at least two such polyolefins which differ from each other with regard to softening point, melting range and molecular weight (determined viscosimetrically). The mixture is put in molds and heated. As starting materials polyolefins are used, particularly aliphatic polyolefins and mixtures of polyolefins which have been produced with the use of Ziegler-Natta catalysts, also polymers produced by other methods, such as the so-called Phillips and Stanolind processes.

The drawing illustrates the claimed process in the form of a diagrammatic flow diagram.

The starting materials can be used as powders in the state in which they are obtained in the polymerization and even may still contain certain amounts of residual solvents. However, essential freedom from residual solvents is preferred. De-ashing is required only for very special purposes and normally is not necessary.

It is required to produce mixtures of polyolefins for the process according to the invention which have distinctly different softening ranges and/or melting ranges. It is a known fact that, with high-molecular polymers, the transition from the solid to the liquid state is not sharp and proceeds only gradually (G. Schulz, "Die Kunststoffe," 1959, 439–441). However, it is feasible to determine the softening and melting ranges by means of suitable methods (ASTM D36–26; DIN1995, Schulz, loc. cit.—the term DIN stands for Deutsche Industrienormen, i.e., German Industrial Norms). The differences between the softening ranges of the components of a mixture to be fabricated according to the invention should at least be 5° C., and preferably more than 10° C. For example, the following mixtures can very well be fabricated: Polyethylene having a softening range 120–126° C. with polyethylene of a softening range of 134–139° C.; or polyethylene having a softening range of 122–126° C. with polypropylene having a softening range of 160–167° C. As a rule, the differences in softening ranges correspond to substantial differences of the molecular weights of the polymers. When polymer mixtures are used which had been produced from the same alpha-olefin, the difference between the molecular weights should be more than 50,000, and preferably more than 100,000 for polyethylene; and, for polypropylene, should be at least 20,000, and preferably 50,000. As shown below in the examples and tables relating thereto, mixtures of, e.g., polyethylene, polypropylene and copolymers thereof, can simultaneously be employed. In these instances, also, similar differences in molecular weights and softening ranges, respectively, should be observed. It is advisable to choose, with mixtures of like polyolefins, for the component of the lower softening range, a molecular size which is at least one-half lower than that of the other component. Thus, such mixtures of resins may have molecular weights, e.g., of 30,000 plus 100,000 or 200,000; or 400,000 plus 1,000,000; etc. In some instances it also is feasible to utilize polymers for the process according to the invention which have a broad distribution of molecular weights.

When polymers of alpha-olefins having three or more carbon atoms or copolymers of, e.g., ethylene and propylene, ethylene and butylene or ethylene and branched alpha-olefins, are to be used, it is advisable to free these products largely of atactic compounds before fabrication.

The proportions of the components to be mixed may vary over a wide range. However, it is of advantage to have an excess of the higher-molecular compound, e.g., 1 part by weight polyethylene having a molecular weight of 40,000 and 1.5 to 10 parts by weight polyethylene of a molecular weight of 1,000,000. Particularly favorable are proportions of one part by weight low-molecular to 1.5–4 parts higher molecular polymer. The same considerations are valid for mixtures of different polyolefins and/or copolymers thereof, or for polybutylene.

Furthermore, it is feasible to produce mixtures of more than just two components, for instance, of polyethylene having molecular weights of 40,000; 500,000; and 1,000,000; or of three or more different polyolefins and/or copolymers. The number of possible combinations is extremely high, it being possible to compose either the component of the lower or of the higher molecular weight or both of mixtures, for instance, the lower component of 40,000; 70,000; and 100,000; or the higher-molecular component of 250,000; 500,000 and 1,000,000.

Depending on the intended end use of the article to be made, it is opportune to add to the mixtures inhibitors and/or stabilizers, and it also is possible without difficulty to incorporate organic or inorganic pigments and dyes. These colorants can be added either to the entire mixture or else can be milled first into a part of one of the components which then is stirred into the remainder of the total polymer mixture by means, e.g., of a high-speed mixer. Depending upon the end use of the finished article, the colorants must be so chosen that they comply with requirements pertaining to being harmless and generally suitable.

Good results also are obtained when fillers, either organic or inorganic, are incorporated in the polyolefin mixtures.

An excellent manner of determination of the utility of single mixtures for their sintering into porous bodies consists in establishing the zero-strength-time values (ZST-values) of the individual components. This value is a measure of the melt viscosity and the flow properties of the plastics and is the normal tension, relative to the cross section of a sample rod (18 mm. x 4 mm.), which is required to elongate the rod in glycerol at 150° C. during 10 minutes by 600 percent. The values found are reported in pond/cm.$^2$ (pond/cm.$^2$=gram/cm.$^2$).

When, for instance, polyethylene is fabricated in a mixture of two components, the maximum porosity of the article produced is attained when, under otherwise identical conditions, the differences in the molecular weights of the two components are as big as possible. Conversely, the porosity decreases, the closer the molecular weights of the two components are. The advantages of the products whose molecular weights are closer to each other are higher chemical and mechanical stability, especially, when the mixtures consist of polyethylene with higher-molecular weight with polyethylene with very high molecular weight.

To what extent the porosity depends upon the difference in molecular weights plus the ZST-values of the single components, is evident from Table 1.

The testing of the products obtained according to Table 1 shows the following results with respect to the porosities:

Whereas the mixture of components of the same molecular weight of 1,000,000 and relatively approximate ZST-values has a gas permeability of 6–7 l./h./cm.$^2$, a mixture of a polyethylene having a molecular weight of 40,000 with one having a molecular weight of 1,000,000 attains a permeability of 12–13 l./h./cm.$^2$.

TABLE 1.—INFLUENCE OF THE MOLECULAR WEIGHT AND THE ZST-VALUES OF POLYETHYLENES ON THE POROSITY OF SINTERED POLYETHYLENE PLATES

| First Polyethylene Component | | Second Polyethylene Component | | |
|---|---|---|---|---|
| Mol. Wt. | ZST-Value | Mol. Wt. | ZST-Value | V* |
| 40,000 | 21 | 1,000,000 | 9,000 | 12.4 |
| 100,000 | 140 | 1,000,000 | 9,000 | 10.0 |
| 250,000 | 560 | 1,000,000 | 9,000 | 8.3 |
| 500,000 | 900 | 1,000,000 | 9,000 | 7.1 |
| 1,000,000 | 4,100 | 1,000,000 | 9,000 | 6.5 |

*V is the air permeability expressed as liters per hour per square centimeter, measured at a differential pressure of 20 mm. hydraulic head on plates of 10 mm. thickness.
Proportions of first to second component: 1:2 parts by volume.
Reaction Temperature: 165° C. Reaction Time: 1 hour.

The dependency of the porosity at constant molecular weight and increasing ZST-values is shown in another test series given in Table 2. Under the same conditions the porosity increases steadily with increasing ZST-values and with increasing differences between the ZST-values of the single components. As the result of numerous tests it has been established that the differences in the molecular weights must be high enough that the molecular weight of the higher-molecular component is at least triple, and preferably 5 times, that of the lower-molecular component. The difference in the ZST-values should be at least one and a half times.

TABLE 2.—INFLUENCE OF THE ZST-VALUE AT CONSTANT MOLECULAR WEIGHT ON THE PERMEABILITY OF SINTERED POLYETHYLENE PLATES

| First Polyethylene Component | | Second Polyethylene Component—V* | | | |
|---|---|---|---|---|---|
| Mol. Wt. | ZST-Value | Mol. Wt. | ZST-Value | 140° C. | 145° C. |
| 40,000 | 21 | 1,000,000 | 3,350 | 7.6 | 8.8 |
| | | | 4,100 | 8.9 | 9.3 |
| | | | 4,800 | 10.1 | 9.9 |
| | | | 6,000 | 12.2 | 10.6 |
| | | | 6,200 | 12.6 | 10.8 |
| | | | 8,500 | 16.5 | 12.3 |

*V is the air permeability expressed as liters per hour per square centimeter, measured at a differential pressure of 20 mm. hydraulic head on plates of 10 mm. thickness.
Proportions of first to second component: 1:2 parts by volume.
Reaction Time: 2 hours. Reaction Temperatures: 140 and 145° C. respectively When polyethylene mixtures are fabricated, it is advantageous to have the molecular weights of the single components substantially exceed the differences named above. One part of the mixture can have ten to one hundred times the molecular weight of the other. When the porosity of the material is judged by the ZST-values of the single polyethylene components, it is found that best results are obtained when at least a part of the mixture has a ZST-value of 1,000 to 15,000.

The proportions of the single components in a polyolefin mixture can be varied within wide limits. Changes are feasible within a wide margin depending upon the kind of polyolefin, its molecular weight, the time and temperature conditions during the fabrication process and the end use of the article formed. In general it has been established that with large proportions of lower-molecular components the porosity increases, but also the brittleness of the article thus manufactured. Inversely, the porosity decreases with a decrease in the low-molecular component and the strength of the finished article increases. Generally, the lowest usable proportion of low-molecular components is 15 percent, the highest 80 percent as shown in Table 3.

In many instances it is useful to sift the polyolefins before mixing them. This facilitates uniformity of the material and removal of small portions of agglomerates or of larger particles. The employment of sifted material also influences the size of the pores and the porosity in that, with increasingly finer mesh of the powder used, the fineness of the pores increases, whereby, however, the gas permeability decreases a little. Coarse mesh powders produce articles having larger pores and correspondingly less resistance to the permeability of gases. Although it is feasible to sift only one of the components, it is preferred to sift both of them, whereby the same or different meshes can be employed. It also is feasible to mix sifted with unsifted polymers. In lieu of sifting, mechanical comminution can be applied, e.g., by means of a high-speed mill, or this can be combined with sifting.

TABLE 3

| Polyethylene | Molecular Weight | | Molecular Weight | |
|---|---|---|---|---|
| | 100,000 | 1,000,000 | 500,000 | 1,000,000 |
| ZST-value | 140 | 8,800 | 900 | 8,800 |
| Mesh, mm | 0.8 | 1.0 | 0.8 | 1.0 |
| Reaction Temp.,° C | 165 | | 165 | |
| Reaction Time, hrs | 1.25 | | 1.25 | |
| | V* | | V* | |
| | (a) | (b) | (a) | (b) |
| Parts by Volume low mol. Components in 100 parts of Mixture: | | | | |
| 10 | 4.6 | 11.6 | 4.4 | 11.9 |
| 20 | 5.3 | 13.3 | 5.3 | 13.9 |
| 30 | 6.1 | 15.1 | 6.1 | 15.9 |
| 40 | 6.8 | 16.7 | 6.9 | 17.7 |
| 50 | 7.4 | 18.3 | 7.5 | 18.6 |
| 60 | 7.9 | 19.7 | 8.1 | 20.9 |
| 70 | 8.4 | 21.0 | 6.8 | 18.5 |
| 80 | 6.3 | 15.9 | | |

*V is the air permeability in l./hrs./cm.$^2$ on 10 mm. thick plates, measured at:
(a) a differential pressure of 20 mm. hydraulic head,
(b) a differential pressure of 50 mm. hydraulic head.

After the mixture has been prepared from the single components and, if desired, with additives as named above, the same is poured in a mold which either is polished or clad with a foil, e.g., aluminum foil, or else has been rubbed with a high-boiling release agent. Particularly suited as the latter are polyalcohols, such as ethylene glycol, propylene glycol, butane triol, glycerol; also ethers, such as diethylene glycol, diethylene glycol, diethylene glycol mono and dimethyl ethers; and silicones.

When the conditions named above for making porous articles are fulfilled by making the proper mixtures of polyolefins, the result of the sintering process depends to a large extent on the conditions under which sintering is carried out. The variation of the pressures does not offer great possibilities. It has been found that an increase in pressure leads to products having higher density and less porosity. Hence, the use of atmospheric pressure in general is preferred. If and when higher pressures are to be applied, it is desirable not to exceed 3 kg./cm.$^2$.

The formation of voids upon filling the mold with mixture is averted by repeated vibration, caused, e.g., by shaking, pushing or tapping of the mold. Usually a short time only is required therefor. If longer periods of time should be used for these vibrations, a certain increase in the density of the mass poured is simultaneously accomplished, which, under certain conditions, may be desirable. The filled mold then is put in a drying cabinet or oven and is heated to temperatures of approximately 130–200° C. and, preferably, between 145–180°. Heating can also be carried out by other means, i.e., by infrared lamps. The heating also can be accomplished either batchwise or continuously, the latter, e.g., by means of a conveyor traversing a heated space.

The choice of the sintering temperature closely governs the time of sintering. As stated, the temperature range is 130 to 200° C. and, preferably, 145 to 180°. The temperature to be employed depends upon the melting characteristics of the individual components in the polyolefin mixture. Upon the temperature employed depends the time allowed for sintering, shorter times being required for higher temperatures, and longer times for lower temperatures. The sintering time lies between 30 and 600 minutes, preferably between 60 and 300 minutes. It has been observed that the sintering temperature and time shown an optimum with regard to the porosity which, although not very strictly limited, nevertheless leads to an obvious deterioration of the porosity, when exceeded.

When, for instance, two polyethylenes are mixed in a volume proportion of 1:2, having respective molecular weights of 600,000 and 1,000,000 and respective ZST-values of 900 and 8,800, and these are sintered at 165° C. for three different amounts of times, i.e., 1 hour; 1.5 hours; and 2 hours; an optimum porosity is found with a sintering time lying between 1.5 and 2 hours. These effects are further shown in Table 4(I) below.

When the mixture consists of a polyethylene having a moluceular weight of 40,000 and a ZST-value of 21, and of a polyethylene having a molecular weight of 1,000,000 and a ZST-value of 8,500, in a proportion of 1:2 by volume, and this is sintered at 140° C. at different periods of time, it has been established that the area of optimum porosity is between 3 and 7 hours. Both below and above these times, the porosity decreases considerably. When the sintering temperature is 145 or 150° C., the optimum porosity is attained at a shorter time, lying approximately between 1 and 4 hours. Simultaneously, it is found that the optimum porosity at a sintering temperature of 150° C. is, numerically, distinctly below the optimum at a temperature of 145° C. This is further shown in Table 4(II).

The decrease in porosity, occuring with higher sintering temperatures, proceeds in proportion to an increase in density. When sintering the polyolefin mixture described directly above, the density of the porous articles manufactured rises from approximately 0.34 to approximately 0.46 by raising the sintering temperature from 140° to 160° C. This is further shown in Table 4(III).

The apparent specific gravity of the porous polyolefin articles manufactured according to the invention, depending upon the starting materials and the process conditions, generally lie between 0.3 and 0.6. A further increase in porosity can be effected by the addition of blowing agents before sintering.

The reaction temperature and the time depend on the thickness of the layer, the composition of the mixture and the material used as mold. Mixtures of low-molecular polyolefins need lower temperatures than those of higher-molecular ones. When the molds consist of copper, the sintering time is shortened over the time when iron molds are used, due to the better heat conductivity of copper. The employment of porous molds is disadvantageous due to the lack of heat transfer. The reaction time can be as long as 8 hours and even more, however, in most instances, 3 hours suffice to terminate the reaction. If the mold has a comparatively thick wall, it can be of advantage to fill and heat in several portions.

The sintering time also depends on the cross section of the article to be made. It has been established that the sintering time must be lengthened corresponding to the wall thickness of the articles. In general, when these articles have a wall thickness of more than 20 mm., an increase in the sintering time of 1 to 2 hours is required for each 10 mm. additional wall thickness.

Under the influence of the heat during sintering, the danger exists that the polyolefin mixture oxidizes in the presence of air. It, therefore, is advantageous to carry out the sintering process in an inert gas atmosphere. The addition of oxidation inhibitors also may be desirable. A dual effect is obtained by covering the surface with a plate, i.e., the entry of air is inhibited, and simultaneously the formation of a smooth surface of the finished article is attained.

After finishing the thermal treatment, the mold is withdrawn from the oven and allowed to cool. The finished porous article then can be taken out of the mold without difficulty. When the correct reaction temperatures and the correct proportions of the mixtures have been used, practically no shrinkage of the finished article has occurred.

The process according to the invention also can be carried out with light polyolefins which have been prepared as explained in our copending application Serial Number 33,398, filed June 2, 1960. When these are employed, porous articles of extremely low apparent specific gravity are obtained.

The porous articles made according to the invention have excellent properties. They are water-repellent and can be fabricated mechanically. Their resistance to acids, alkalies, salt solutions, detergents and organic solvents, such as ketones, alcohols, esters, ethers, aliphatic and aromatic hydrocarbons, should be stressed. Due to these valuable properties, the solid porous polyolefin articles can be employed for great many technical and industrial purposes, for instance, for gas and liquid filtration at normal and elevated temperatures, such as filter candles; as insulating materials in cooling and freezing plants; as heat insulation; as floating bodies; upholstering material; fenders for boats; electrolytical membranes; in storage batteries; as air cushions; and in the textile and packaging industries. Very good success is attained with these articles in gardening as flower pots and flower boxes.

The invention now will be further illustrated with reference to the following examples. However, it should be understood that these are given merely by way of explanation, not of limitation, and that numerous changes may be made in the details without departing from the spirit and the scope of the invention as hereinafter claimed.

All temperatures are given in degrees centigrade. The proportions of the polyolefins are parts by volume in all examples, unless otherwise specified. The molecular weights were determined viscosimetrically at 135° in decaline.

TABLE 4

| Polyethylene | 1 | 2 |
|---|---|---|
| Mol. Wt | 40,000 | 1,000,000 |
| ZST-value | 21 | 8,800 |
| Proportions by volume | 1:2 | |

I. INFLUENCE OF THE REACTION TIME ON THE POROSITY AT CONSTANT TEMPERATURE
[Sintering temperature: 140° C.]

| Sintering time (hours): | V* |
|---|---|
| 1.5 | 7.7 |
| 2 | 9.1 |
| 3 | 11.3 |
| 4 | 12.4 |
| 5 | 12.7 |
| 6 | 11.9 |

II. INFLUENCE OF THE REACTION TEMPERATURE ON THE POROSITY AT CONSTANT TIME

| Polyethylene | 1 | 2 |
|---|---|---|
| Mol. Wt | 40,000 | 1,000,000 |
| ZST-value | 21 | 8,500 |
| Proportions by volume | 1:2 | |

[Sintering time: 2 hours]

| Sintering Temp. (° C.): | V* |
|---|---|
| 140 | 16.4 |
| 145 | 12.9 |
| 150 | 11.9 |
| 155 | 11.4 |
| 160 | 11.0 |
| 165 | 10.8 |

III. DEPENDENCY OF THE APPARENT SPECIFIC GRAVITY OF SINTERED POLYETHYLENE PLATES ON THE REACTION TEMPERATURE AT CONSTANT MIXING PROPORTIONS

| Sintering Temp. (° C.): | Apparent Spec. Gr. |
|---|---|
| 140 | 0.342 |
| 145 | 0.386 |
| 150 | 0.420 |
| 155 | 0.442 |
| 160 | 0.450 |

*V is the air permeability of 10 mm. thick plates per litter per hour per square centimeter, measured at a different pressure of 20 mm. hydraulic head.

Example 1

The polyolefin mixtures are filled in a mold of 250 x 300 mm., whose bottom plate is made of stainless steel or glass. The mixture is a powder, is evenly distributed in the mold and has a height of 10–11 mm. It is covered with a stainless steel or glass plate. Both bottom and cover plates previously had been rubbed or powdered with the calcium stearate. The cover plate is pressed lightly against the powder. The filled mold is inserted in an oven, wherein a nitrogen atmosphere prevails, for certain lengths of time and at certain temperatures, in accordance with Tables 1–4. After termination of the reaction the mold is removed from the oven, is allowed to cool to approximately 50–60°, and the finished sintered porous plate is removed therefrom. After 24 hours, plates of a cross section of 10 cm. are made from the original plates which are tested for air permeability at differential pressures of 20 and 50 mm. hydraulic head, respectively. The results obtained are calculated to one square centimeter and a plate thickness of 10 mm.

Example 2

One part polyethylene of a molecular weight of 40,000 (bulk weight 245 g./l.) and two parts polyethylene of a molecular weight of 1,000,000 (bulk weight 260 g./l.) are thoroughly mixed and filled in a mold of 250 x 300 mm. whose bottom is a glass plate. The latter previously had been rubbed with calcium stearate. The pouring height of the powder is 10 mm. A glass plate which had been powdered with calcium stearate is laid on the powder and is slightly pressed against it. The mold then is inserted in an oven at 140° through which a weak stream of nitrogen is conducted. After a reaction time of 2 hours, the mold is removed from the oven and is allowed to cool. Both glass plates are easily taken off the solid porous polyethylene mass. The latter is uniformly sintered and has a specific gravity of 0.35.

Example 3

Under the same conditions as in Example 2, a mixture of 10 parts polyethylene having a molecular weight of 40,000 and 90 parts polyethylene having a molecular weight of 1,000,000 was sintered for one hour at 165°. The porous plate thus obtained has good strength properties and a specific gravity of 0.37.

Example 4

60 parts polyethylene of a molecular weight of 40,000 and 40 parts polyethylene of a molecular weight of 1,000,000 are sintered for 2 hours at 145° in the manner described in Example 2. The porous polyethylene plate thus obtained has good strength properties and a specific gravity of 0.44.

Example 5

In 450 ml. of the polyolefin mixture described in Example 2, 2 g. of a blue colorant were evenly distributed. The colorant was Sicoplast II D2000 (registered trademark, Siegle & Co., Stuttgart-Feuerbach, Germany). This mixture was filled in a polished flower pot mold, made of spring steel and rubbed with calcium stearate. The mold consisted of a male and a female part and, after filling, was pushed several times to fill any voids possibly being present within the powder. It then was inserted in a drying oven at 145° for 2 hours, thereafter withdrawn and allowed to cool to approximately 50–60°. The flower pot thus manufactured was easily removed from the mold, was porous and had good strength.

Example 6

50 ml. of the mixture described in Example 2 were mixed in a high-speed mixer with 2 g. carbon black and 0.5 g. N-phenyl-N'-cyclohexyl-p-phenylene diamine (a stabilizer) for 30 seconds at 6,000 r.p.m. This mixture then was stirred into 400 ml. of the mixture as described in Example 2. This mixture was filled alternately with the one described in Example 5 into the flower pot mold of Example 5, which had been polished and rubbed with calcium stearate, tapped several times and put in an oven, having therein a nitrogen atmosphere, at 145° for 2 hours. The mold then was withdrawn, allowed to cool to approximately 50°, and the finished flower pot taken out of the mold. It was flamed, porous and of great strength.

Example 7

A mixture of one part polyethylene having a molecular weight of 500,000 (bulk weight 246 g./l.) and 2 parts polyethylene of a molecular weight of 1,000,000 (bulk weight 269 g./l.) was filled in a mold of 250 x 300 mm. to a height of 10 mm. The bottom of the mold was a 2 mm. thick V2A stainless steel plate, and a like plate was used as cover plate. The assembly was kept in an oven at 165° for one hour in a nitrogen atmosphere. Both plates had been rubbed with calcium stearate. After withdrawal from the oven and cooling to room temperature, the plates were easily removed from the porous polyolefin plate thus obtained. The plate had a specific gravity of 0.41.

Example 8

Equal parts polyethylene having molecular weights of 50,000; 100,000; 500,000; and 1,000,000 were mixed and heated under the conditions described in Example 7, for 2 hours at 160°. The sintered polyolefin mixture had great strength and a specific gravity of 0.47.

Example 9

A mold of 250 x 300 mm. having a bottom plate of 2 mm. thick V2A stainless steel rubbed with calcium stearate was filled with a 10 mm. high layer of a polyethylene having a molecular weight of 1,000,000, which was covered with a glass plate. The constants of the polyethylene showed that it was not a uniform product and had at least two molecular weight maxima (cf. Wesslau, "Die Molekulargewichtsverteilung einiger Niederdruckpolyaethylene," translated: The molecular weight distribution of a number of low-pressure polyethylenes, in the periodical "Die Makromolekulare Chemie," vol. XX, 1956, pp. 138–139, Tables 15 and 17, and 14 and 18, respectively). It had the following constants:

$\delta_R^{120°}$   254–301 kg./cm.² tear strength
$\delta_B^{120°}$   33–34 kg./cm.² tensile strength
$\delta_R^{120}$   831–925% elongation at break The filled mold was kept in an oven in a nitrogen atmosphere for 2 hours at 150°. After cooling to room temperature, the plates were easily removed. The mass obtained was porous, uniformly sintered, had good strength and a specific gravity of 0.38.

Example 10

A mixture was prepared from 1 part polyethylene as described in Example 9, and 2 parts of a polyethylene having a molecular weight of 1,000,000 and the following constants:

$\delta_R^{120°}$   323 kg./cm.²
$\delta_B^{120°}$   37 kg./cm.²
$\delta_R^{120}$   875%

The mixture was sintered at 165° for 1.5 hours as described in Example 7. The plate obtained was porous, of great strength and had a specific gravity 0.39.

Example 11

Two parts polyethylene as in Example 9 were mixed with one part polyethylene of a molecular weight of 50,000, and the mixture heated for 2 hours at 145° according to Example 7. A porous plate of great strength was obtained which had a specific gravity of 0.38. The plate could be painted with, i.e., a red synthetic resin paint. The latter adhered well, and the porosity of the plate remained. Plates thus painted or printed can be used as insulating materials or as street signs, e.g., warning signs on highways.

Example 12

A mixture of 1 part polyethylene of a molecular weight of 10,000 and 2 parts polyethylene of a molecular weight of 1,000,000 were heated for 2 hours at 145° according to the procedure in Example 2. The porous plate obtained had good strength properties and a specific gravity of 0.29.

Example 13

A filter candle was manufactured in a device consisting of a 2 mm. thick V2A stainless steel bottom plate carrying 3 guide pins and 3 springs, an inner, polished, stainless steel jacket having an I.D. of 80 mm. and a length of 300 mm. and a core piece which was a steel pipe, welded closed on the bottom and polished on the outside, having an outer diameter of 55 mm. and a length of 290 mm. The core piece had, on its open end, a cap provided with a plurality of openings and was of such a size that it exactly fit the jacket. On the outer rim of the cap, three holders for the springs of the bottom plate were provided. The polished parts and the bottom plate, prior to use, had been rubbed with calcium stearate. As release agents, silicones can be used. After assembling the device, it was filled with the polyethylene mixture described below, and the core piece was tightly pressed on. Then, the springs were fastened to the cap. By opening the cap, the space between jacket and core piece was filled with the mixture. After filling, the device was tapped lightly twice and then put in an oven having a nitrogen atmosphere for 2 hours at 165°. After removal from the oven, it was allowed to cool to 50–60°. At these temperatures, the filter candle could easily be removed from the device. The mixture consisted of 1 part polyethylene of a molecular weight of 250,000 and 2 parts polyethylene having a molecular weight of 1,000,000.

Example 14

One part polyethylene of a molecular weight of 50,000 and one part polypropylene of a molecular weight of 320,000 were sintered according to Example 10 at 160° for 2 hours. The polypropylene had been produced with the use of Ziegler-Natta catalysts and had been extracted with warm heptane. The plate obtained had good porosity and a specific gravity of 0.42.

Example 15

One part polyethylene having a molecular weight of 100,000 and a bulk weight of 259 g./l. and one part polyethylene of a molecular weight of 250,000 and a bulk weight of 259 g./l. were mixed with two volume parts of saw dust which had a mesh of 0.5 and a bulk weight of 180 g./l. This mixture was sintered as described in Example 2 for 2 hours at 150°. The porous plate thus obtained had a specific gravity of 0.37.

Example 16

A mixture was prepared consisting of 0.7 parts polyethylene of a molecular weight of 50,000 and a bulk weight of 265 g./l.; 0.7 part polyethylene of a molecular weight of 100,000 and a bulk weight of 259 g./l.; 0.7 part polyethylene of a molecular weight of 250,000 and a bulk weight of 259 g./l.; and 2 parts by volume saw dust having a mesh of 0.5 mm. and a bulk weight of 180 g./l. This mixture was heated as in Example 2 at 150° for 2 hours. The finished porous plate had a specific gravity of 0.41.

Example 17

0.35 part polyethylene of a molecular weight of 50,000 and a bulk weight of 259 g./l.; 0.35 parts polyethylene of a molecular weight of 100,000 and a bulk weight of 253 g./l.; and 0.3 parts by volume blast furnace fly ash (bulk weight 380 g./l. were mixed and sintered as in Example 2 for 2 hours at 140°. The plate obtained had a specific gravity of 0.44.

Example 18

The substitution of kieselguhr for the fly ash in Example 17 led to a plate having a specific gravity of 0.43.

Example 19

800 ml. of a polyethylene mixture consisting of 1 part polyethylene of a molecular weight of 50,000 and a bulk weight of 265 g./l., and one part polyethylene of a molecular weight of 1,000,000, a bulk weight of 253 g./l. and a ZST-value of 8,900, are intimately mixed with 0.6 g. benzoyl peroxide, and the mixture filled in the mold as described in Example 2 and heated at 160° for 1.75 hours. The solid porous plate has a specific gravity of 0.42.

Example 20

In the polyethylene mixture of Example 19, the benzoyl peroxide is replaced by 1.2 g. benzene-1.3-disulfohydrazide. The sintering process is carried out at 160° for 2 hours according to Example 2. The porous plate has a specific gravity of 0.4.

Example 21

A mixture was prepared from 1 part polyethylene of a molecular weight of 40,000 and a bulk weight of 37 g./l. and a polyethylene of a molecular weight of 1,000,000 and a bulk weight of 267 g./l. The mixture was filled in a mold of 250 x 300 mm., having a bottom plate of V2A stainless steel and rubbed with calcium stearate, to a filling height of 10–11 mm. and was evenly distributed therein. A glass plate, also rubbed with calcium stearate, served as cover and was pressed lightly on the powder.

As can be seen, the porosity clearly increased with diminishing pressure, especially below 1.5 kg./cm.$^2$.

By comparison, in the experiment conducted at a pressure of 10 kg./cm.$^2$, a temperature of 150° C., and sintering time of 105 minutes, the highest porosity and the lowest resistance, respectively, were obtained.

Simultaneously, it was established that the elasticity of the plates prepared at low pressures, i.e. below 1.5 kg./cm.$^2$ and especially below 1.25 kg./cm.$^2$, was by far the best.

TABLE 5

1 volume part polyethylene, molecular weight, $1 \times 10^5$, bulk weight, 171 g./l.
2 volume part polyethylene, molecular weight, $1 \times 10^6$, bulk weight, 172 g./l.
Reaction temperature: heating plate at the bottom, 120° C., upper heating plate, 140° C.

| Pressure applied, kg./cm.$^2$ | 1.5 | | 2.0 | | 3.5 | | *1.01 | |
|---|---|---|---|---|---|---|---|---|
| Air permeability, l./h./cm.$^2$ (measured at mm. Hg) | 50 | | 100 | | 100 | | 20 | |
| Bulk, specif. gravity | | g./cm.$^3$ | | g./cm.$^3$ | | g./cm.$^3$ | | g./cm.$^3$ |
| Sintering Time, min.: | | | | | | | | |
| 5 | | | 40.2 | 0.463 | | | | |
| 15 | 35 | 0.45 | 34.5 | 0.496 | 26.5 | 0.553 | | |
| 20 | | | 38.1 | 0.481 | | | | |
| 30 | 35 | 0.45 | 37.2 | 0.491 | 16.7 | 0.57 | | |
| 45 | | | 30.5 | 0.504 | | | | |
| 60 | 35 | 0.45 | 19.0 | 0.569 | 17.8 | 0.569 | | |
| 105 | 35 | | | | | | 44 | 0.324 |

*Reaction temperature, 150° C.

The mold was kept in a nitrogen atmosphere in an oven at 150° for 1.5 hours. The sintered porous plate thus obtained had a specific gravity of 0.32.

Example 22

One part polyethylene having a molecular weight of 40,000 and a bulk weight of 37 g./l., and 2 parts polyethylene of a molecular weight of 1,000,000 and a bulk weight of 25 g./l. were mixed and sintered according to Example 2 at 140° for 2 hours. The porous, solid and elastic plate obtained had a specific gravity of 0.2.

Example 23

A mixture was prepared from 1 part polyethylene of a molecular weight of 40,000 and a bulk weight of 230 g./l., and 2 parts polyethylene of a molecular weight of 1,000,000, a bulk weight of 279 g./l., and a ZST-value of 6,200. This was filled in a device consisting of a 2 mm. thick bottom plate carrying three guide pins and three springs, and a V2A stainless steel pipe, polished on the inside and having an I.D. of 124 mm. and a height of 247 mm., which was provided, on its upper third, with three holders for the springs of the bottom plate. The polyethylene mixture was pressed lightly five times during filling and was weighted down with an iron plate weighing 90 g. The mold was rubbed with calcium stearate prior to filling. The filled mold was heated 12 hours at 140° in a nitrogen atmosphere. The sintered porous block obtained had a cross section of 120 mm. and a height of 230 mm. and a specific gravity of 0.41.

Example 24

One part polyethylene of a molecular weight of 100,000 and a bulk weight of 171 g./l. and two parts polyethylene of a molecular weight of 1,000,000 and a bulk weight of 172 g./l. were mixed intimately, 115 ml. of this mixture were filled in the mold of a press ($\phi$, 110 mm., filling height, 12 mm.), and the press closed. The heating plate at the bottom was preheated to a temperature of 120° C., the upper plate to a temperature of 140° C. The polyethylene plates obtained after different sintering times were tested for air permeability at standard conditions. The results obtained were as shown in Table 5.

Example 25

In a further example two polyethylenes were used which had a considerably higher bulk density. The polyethylene having a molecular weight of $1 \times 10^5$, had a bulk weight of 379 g./l. The polyethylene having a molecular weight of $1 \times 10^6$, had a bulk weight of 339 g./l. Both were mixed in a volume proportion of 1:2 and sintered at a temperature of 125° C. (bottom plate), and of 145° C. (upper plate), respectively.

The results, obtained at different pressures and duration time, were as shown in Table 6.

TABLE 6

1 volume part polyethylene, molecular weight, $1 \times 10^5$, bulk weight, 379 g./l.
2 volume part polyethylene, molecular weight, $1 \times 10^6$, bulk weight, 339 g./l.
Reaction temperature: heating plate at the bottom, 125° C., upper heating plate, 145° C.

| Pressure applied, kg./cm.$^2$ | 1.5 | | 2.0 | | *1.045 | |
|---|---|---|---|---|---|---|
| Air permeability, l./h./cm.$^2$ (measured at mm. Hg) | 50 | | 50 | | 20 | |
| Bulk, specif. gravity | | g./cm.$^3$ | | g./cm.$^3$ | | g./cm.$^3$ |
| Sintering Time, min.: | | | | | | |
| 5 | | | 34.0 | 0.62 | | |
| 15 | 42.7 | 0.587 | 26.5 | 0.668 | | |
| 30 | 37.5 | 0.63 | 21.7 | 0.687 | | |
| 60 | 35.2 | 0.648 | 35.0 | 0.657 | | |
| 105 | | | | | 42.5 | 0.530 |

*Reaction temperature 156° C.

Corresponding to the preceding experiment, the products, prepared at a pressure below 1.6 kg./cm.$^2$, especially below 1.05 kg./cm.$^2$, have the highest porosity.

Example 26

In a further example, two polyethylenes, having molecular weights of $1 \times 10^5$, and $1 \times 10^6$ respectively, were mixed intensely in a volume proportion of 1:2. The low molecular polyethylene had a bulk weight of 270 g./l., the high molecular polyethylene a bulk weight of 255 g./l. The permeabilities which were obtained at a pressure of 2 kg./cm.² and at temperatures of 115° C. (bottom plate) and 135° C. (upper plate), and at 120° C. and 140° C., respectively, depending on different sintering times, are listed in the following Table 7.

The result of a sintering experiment at a pressure of only 5 g./cm.² during two hours at a temperature of 150° C. also is noted. The porosity thus obtained is greater than those of the other products.

TABLE 7

1 volume part polyethylene, molecular weight, 1×10⁵, bulk weight, 270 g./l.
2 volume part polyethylene, molecular weight, 1×10⁶, bulk weight, 255 g./l.

| Reaction Temperature: | | | | | |
|---|---|---|---|---|---|
| Lower Plate | 115 | | 120 | | |
| Upper Plate | 135 | | 140 | | |
| Pressure applied, kg./cm.² | 2 | | 2 | | *1.005 |
| Air permeability, l./h./cm.² (measured at mm. Hg) | 50 | | | | |
| Bulk, specif. gravity | | g./cm.³ | | g./cm.³ | g./cm.³ |
| Sintering Time, min.: | | | | | |
| 5 | 38.0 | 0.474 | 32.8 | 0.524 | |
| 15 | 31.2 | 0.494 | 25.6 | 0.560 | |
| 20 | 36.6 | 0.500 | | | |
| 30 | 32.9 | 0.522 | | | |
| 45 | 28.6 | 0.537 | | | |
| 60 | 29.7 | 0.543 | | | |
| 120 | | | | 36.0 | 0.371 |

*Reaction temperature, 150° C.

*Example 27*

Instead of a polyethylene of a molecular weight of 1×10⁶, as in Examples 24–26, a polyethylene of a molecular weight of 2.5×10⁵ was used. The results, corresponding to those of the Examples 24–26, are shown in the following Table 8.

TABLE 8

1 volume part polyethylene, molecular weight, 2.5×10⁵, bulk weight, 259 g./l.
2 volume part polyethylene, molecular weight, 1×10⁶, bulk weight, 255 g./l.
Reaction temperature: heating plate at the bottom, 125° C., upper heating plate, 135° C.

| Pressure applied kg./cm.² | 2 | | *1.002 | |
|---|---|---|---|---|
| Air permeability, l./h./cm.² (measured at mm. Hg) | 50 | | 15 | |
| Bulk, specific gravity | | g./cm.³ | | g./cm.³ |
| Sintering time, min.: | | | | |
| 5 | 30.7 | 0.536 | | |
| 15 | 26.6 | 0.562 | | |
| 20 | 28.4 | 0.560 | | |
| 30 | 29.0 | 0.568 | | |
| 45 | 25.0 | 0.577 | | |
| 60 | 22.4 | 0.597 | | |
| 120 | | | 33.1 | 0.455 |

*Reaction temperature, 156° C.

*Example 28*

500 ml. of the polyolefin mixtures listed in Table 9 below are filled into a rectangular frame of 250 x 300 mm. which is equipped with a bottom of a V2A-type stainless steel plate. The plate, prior to filling, had been rubbed with a silicon release paste and then was sprinkled with calcium stearate powder. The pouring height of the powdered and evenly distributed polyolefin mixture is 6.5 mm. The powder then is covered with a thin V2A plate which also had been rubbed with silicone release paste and then powdered with calcium stearate. The frame and plates containing the polyolefin mixtures then are deposited in a heating cabinet at the temperatures and for the time periods listed in Table 9. After the elapsed time of reaction, the assembly is taken from the heating cabinet, and the sintered polyolefin plate is taken out, either while still warm or after cooling.

The density of the sintered plate is determined. Thereafter a round plate of a diameter of 176 mm. is cut out, and the air permeability determined. The values found are calculated for those of a plate of 3 mm. thickness.

The explanations for the footnote numbers in Table 9 follow:

EXPLANATIONS FOR THE FOOTNOTE NUMBERS IN TABLE 9

(1) The copolymer was composed of 90 percent ethylene and 10 percent propylene, copolymerized with a Ziegler type catalyst.
(2) Measuring conditions: calculated on a 3 mm. thick plate for a quantity of air of 100 m.³ per m.² per hour (100 m.³/m.²/h.).
(3) The temperature during reaction time proceeded as follows—

| Time (min.): | Temp., ° C. |
|---|---|
| 0 | 124 |
| 15 | 129 |
| 30 | 132 |
| 45 | 135 |
| 60 | 136 |
| 75 | 138 |
| 90 | 138 |
| 105 | 139 |

(4) $i_5$ is the melt index of a polyolefin measured according to ASTM D1238–57T. The index 5 on the $i$ denotes that the measurements are carried out at a load of 5 kg.
(5) RSV is the reduced specific viscosity ($\eta$ red.). This value is determined substantially according to ASTM D1601–49T.

The sole deviations from the standard method are:
(a) The polymer is dissolved at 135° C. in decaline (decahydronaphthalene).
(b) The concentration of the solution is 0.3 or 0.1 g. per 100 ml. solvent, depending upon the degree of polymerization. E.g., polyethylene of medium molecular weights is measured as a 0.3 g. solution; polyethylene having molecular weights of 1,000,000 or higher, as 0.1 g. solution in 100 ml. solvent.
(c) The viscosity of the solution and of the solvent is determined in an Ostwald viscosimeter having a measuring capillary of 1 mm. diameter.

When $\eta_L$ is the viscosity of the solution, $\eta_0$ that of the solvent, and $c$ the concenration, the reduced specific viscosity is $$\eta \text{ red.} = \frac{\frac{\eta L - 1}{\eta_0}}{c}$$

In the foregoing specification, other polyolefins and copolymers had been named. Their employment, singly or in mixture, in accordance with the conditions as set forth herein, in lieu of those in the preceding examples, yield corresponding results.

TABLE 9

| Test No. | Polyethylene MW×10³ | Polyethylene Bulk wt., g./l. | Polyethylene Parts (vol.) | Copolymer (1) $i_5$ (4) | Copolymer (1) RSV (5) | Copolymer (1) Bulk wt., g./l. | Copolymer (1) Parts (vol.) | Polypropylene $i_5$ (4) | Polypropylene RSV (5) | Polypropylene Bulk wt., g./l. | Polypropylene Parts (vol.) | Reaction Temperature, °C. | Reaction Time, min. | Density | Press. drop (2) |
|---|---|---|---|---|---|---|---|---|---|---|---|---|---|---|---|
| 1 | 1,000 | 357 | 1 | 3.9 | 2.3 | 316 | 1 | | | | | 156 | 60 | 0.65 | 19.0 |
| 2 | 1,000 | 357 | 2 | 3.9 | 2.3 | 316 | 1 | | | | | 156 | 75 | 0.58 | 10.5 |
| 3 | 100 | 379 | 1 | 3.9 | 2.3 | 316 | 1 | | | | | (3) 124–138 | 75 | 0.68 | 13.5 |
| 4 | | | | 3.9 | 2.3 | 316 | 1 | 1.1 | 5.6 | 293 | 1 | (3) 124–139 | 105 | 0.63 | 3.3 |
| 5 | | | | 3.9 | 2.3 | 316 | 2 | 7.2 | 3.4 | 311 | 1 | (3) 124–138 | 75 | 0.72 | 59.0 |
| 6 | | | | 3.9 | 2.3 | 316 | 2 | 1.1 | 5.6 | 293 | 1 | (3) 124–138 | 75 | 0.83 | 60.0 |
| 7 | 1,000 | 357 | 2 | 3.9 | 2.3 | 316 | 1 | 1.1 | 5.6 | 293 | 1 | 156 | 60 | 0.50 | 7.5 |
| 8 | 1,000 / 100 | 357 / 379 | 3 / 1 | 3.9 | 2.3 | 316 | 1 | 7.2 | 3.4 | 311 | 1 | 156 | 60 | 0.55 | 14.5 |
| 9 | 1,000 / 100 | 357 / 379 | 4 / 1 | 3.9 | 2.3 | 316 | 1 | 7.2 / 1.1 | 3.4 / 5.6 | 311 / 293 | 1 | 156 | 70 | 0.63 | 10.8 |

We claim as our invention:

1. A process for the manufacture of solid porous articles having open cells from polyolefins which comprises mixing a first polyolefin with at least one other polyolefin, said polyolefins being selected from the group consisting of polyethylene, polypropylene, copolymers and mixtures thereof, and polybutylene, said first polyolefin differing from said other polyolefin by at least 5 to 10° C. in softening range and by at least 50,000 in molecular weight, as determined viscosimetrically; and sintering the mixture in a mold at pressures ranging from atmospheric to 3 kg./cm.², at temperatures of 130 to 200° C., for 30 to 600 minutes; times, pressures and temperatures depending upon the thickness and the material of said molds and upon the thickness of the layer in which said mixture is present in said mold.

2. A process for the manufacture of solid porous articles having open cells from polyolefins which comprises mixing a first polyolefin with at least one other polyolefin, said polyolefins being selected from the group consisting of polyethylene, polypropylene, copolymers and mixtures thereof, and polybutylene, said first polyolefin differing from said other polyolefin in zero-strength-time value, in molecular weight by at least 50,000, as determined viscosimetrically, and in softening range by at least 5 to 10° C.; and sintering said mixture in a mold at pressures ranging from atmospheric to 3 kg./cm.², at temperatures of 130 to 200° C., for 30 to 600 minutes; times, pressures and temperatures depending upon the thickness and the material of said molds and upon the thickness of the layer in which said mixture is present in said mold.

3. A process for the manufacture of solid porous articles having open cells from polyolefins which comprises mixing a first polyolefin with at least one other polyolefin, said polyolefins being selected from the group consisting of polyethylene, polypropylene, copolymers and mixtures thereof, and polybutylene; said other polyolefin having a melting range at least 5 to 10° C. higher, a molecular weight, as determined viscosimetrically, 10 to 100 times higher, and a zero-strength-time value approximately 1.5 to 900 times higher, than said first polyolefin; said first polyolefin being present at 5 to 80 percent by volume of the total; and sintering said mixture in a mold at 130 to 200° C. for 30 to 600 minutes and at a pressure ranging from atmospheric to 3 kg./cm.²; said mold having a heatable bottom plate and a heatable top plate, the temperature of said bottom plate being 5 to 30 degrees lower than that of said top plate at an operating pressure of more than 1.05 kg./cm.²; times, temperatures and pressures depending upon the thickness and the material of said mold and upon the thickness of the layer in which said mixture is present in said mold.

4. The process as defined in claim 3, wherein sintering is carried out while excluding oxygen by stream of inert gas over and around said mold.

References Cited by the Examiner

UNITED STATES PATENTS

| | | | |
|---|---|---|---|
| 2,698,966 | 1/1955 | Stott et al. | 264—122 |
| 2,742,446 | 4/1956 | Schwarzenbek | 264—127 |
| 3,024,208 | 3/1962 | Goethel et al. | 264—79 XR |
| 3,024,948 | 3/1962 | Rabl. | |
| 3,045,058 | 7/1962 | Martinak | 264—126 XR |
| 3,048,537 | 8/1962 | Pall et al. | 264—126 XR |
| 3,102,300 | 9/1963 | Rottig | 264—126 |

FOREIGN PATENTS

| | | |
|---|---|---|
| 229,871 | 8/1960 | Australia. |
| 679,549 | 9/1952 | Great Britain. |
| 737,111 | 9/1955 | Great Britain. |

ALEXANDER H. BRODMERKEL, *Primary Examiner.*

P. E. ANDERSON, *Assistant Examiner.*